United States Patent
Roberts et al.

(10) Patent No.: US 6,914,548 B2
(45) Date of Patent: Jul. 5, 2005

(54) PROGRAMMABLE DC VOLTAGE GENERATOR

(75) Inventors: Gordon W. Roberts, Montreal West (CA); Mohamed Hafed, Montreal (CA); Sébastien Laberge, St-Augustin (CA)

(73) Assignee: McGill University, Montreal (CA)

( * ) Notice: Subject to any disclaimer, the term of this patent is extended or adjusted under 35 U.S.C. 154(b) by 657 days.

(21) Appl. No.: 09/844,277

(22) Filed: Apr. 30, 2001

(65) Prior Publication Data

US 2003/0006924 A1 Jan. 9, 2003

Related U.S. Application Data

(60) Provisional application No. 60/200,389, filed on Apr. 28, 2000, and provisional application No. 60/205,470, filed on May 19, 2000.

(51) Int. Cl.[7] ............................. H03M 1/82; G05F 1/10; G05F 3/02
(52) U.S. Cl. ....................... 341/152; 327/538
(58) Field of Search ............................. 341/144, 145, 341/152, 133, 147; 327/306, 536, 537, 538

(56) References Cited

U.S. PATENT DOCUMENTS

| | | | | |
|---|---|---|---|---|
| 5,187,386 A | * | 2/1993 | Chang et al. | 327/537 |
| 6,081,150 A | * | 6/2000 | Yamaura et al. | 327/306 |
| 6,236,344 B1 | * | 5/2001 | Benz et al. | 341/133 |
| 6,317,067 B1 | * | 11/2001 | Mohindra | 341/145 |
| 6,337,595 B1 | * | 1/2002 | Hsu et al. | 327/538 |
| 6,459,398 B1 | * | 10/2002 | Gureshnik et al. | 341/144 |
| 6,703,957 B2 | * | 3/2004 | Morimoto et al. | 341/152 |
| 6,737,907 B2 | * | 5/2004 | Hsu et al. | 327/536 |

* cited by examiner

*Primary Examiner*—Patrick Wamsley
(74) *Attorney, Agent, or Firm*—Downs Rachlin Martin PLLC

(57) ABSTRACT

An efficient technique for generating accurate on-chip DC reference voltages is based on filtering a digital pulse modulated sequence in order to extract its average value encoding a DC level, A passive on-chip filter is used for simplicity with an all-digital modulator implementation. Modulation is proposed using pulse-width and preferably pulse-density modulation methods. The latter has the advantage of using a significantly smaller filter which translates into a smaller implementation and faster operational settling times. Many digital pulse modulation generators are proposed.

31 Claims, 8 Drawing Sheets

Number System
— Single Bit
— Floating Point

PROGRAMMABLE DC VOLTAGE GENERATOR

CROSS-REFERENCE TO RELATED APPLICATIONS

This application claims the benefit of United States Provisional Application No. 60/200,389 filed Apr. 28, 2000 and U.S. Provisional Application No. 60/205,470 filed May 19, 2000.

MICROFICHE APPENDIX

Not applicable.

FIELD OF THE INVENTION

The invention relates to common analog microelectronic building blocks, namely voltage reference generators and a method for generating a voltage reference.

BACKGROUND OF THE INVENTION

The need for new approaches to analog design, in general, arises as a result of the general scaling trends in semiconductor integrated circuit technology. The reason is that technology scaling is generally driven by the need for improved digital integrated circuits, which constitute the majority of circuits in the microelectronics and computer industries. However, scaling generally makes analog design more challenging. For example, digital scaling requires downscaling power supply voltages (for improved reliability and power dissipation), but this can significantly hinder the performance of analog circuits.

From another perspective, although scaling generally means reduced implementation areas for digital circuits (due to the reduction in transistor dimensions) the reduction in analog circuit implementation area (for a given set of performance requirements) is not as significant. Hence, the gains from scaling are sometimes masked in relation to analog integrated circuits.

One option to take advantage of scaling is to use digital or mixed digital/analog solutions rather than typical all-analog solutions for certain circuits. A typically all-analog circuit ripe for re-implementation is a DC voltage generator.

SUMMARY OF THE INVENTION

According to the invention, there is provided a mixed-circuit DC voltage generator. The DC voltage generator uses digital pulse modulation to encode a DC level in the average value of a periodic digital sequence, and uses an averaging circuit (e.g. a passive low pass filter) to extract the DC average from the periodic digital sequence. The DC voltage generator may be programmable. The periodic sequence length and pattern may be selected to achieve a consistent average DC level with the desired level of adjustment control in the DC output.

According to an aspect of the invention, a DC voltage generator comprises a digital pulse modulation (DPM) generator for generating a periodic bit-stream encoding a DC voltage level in the average value of the bit-stream; and an analog averaging circuit for receiving and decoding the periodic bit-stream for generating an average DC voltage.

Preferably, the DPM generator may comprise a memory based periodic bit-stream generator circuit and may comprise a programming means for selecting the bit-stream encoding the DC level. In accordance with an embodiment of the invention, the DPM generator may comprise a pulse width modulation (PWM) generator circuit for encoding the DC level in a PWM periodic bit-stream, In accordance with an alternate embodiment, the generator may comprise a pulse density modulation (PDM) generator circuit for encoding the DC level in a PDM periodic bit-stream In a preferred embodiment, the DPM generator is memory based and comprises a circular shift register having means for receiving a series of bits encoding a DC level in a bit-stream; means for serially outputting the bits and means for circling the series of bits output to the means for receiving. The DPM generator may further comprise a programming means for selecting the series of bits encoding the DC level and the programming means provides the bit-stream to the means for receiving of the circular shift register. The programming means may comprise a software based $\Sigma\Delta$ modulator. While many different modulation schemes, for example, pulse width modulation, are useful with the preferred embodiment to distribute the 1s and 0s in the generated bit-streams, preferably, the bit-stream is a pulse density modulation bit-stream. A further memory based DPM generator circuit comprises a linear feedback shift register.

In accordance with an exemplary embodiment, the PWM generator circuit may be memory based and comprise a counter for outputting a count; and a comparator for receiving the count, comparing the count to a reference value, and outputting the PWM periodic bit-stream in response to the comparison of the count and reference value.

In accordance with further embodiments, the DPM generator may comprise a an automated test equipment.

In accordance with a preferred embodiment, the analog averaging circuit comprises a capacitor and resistor for generating the average DC voltage.

In yet a further embodiment, the DC voltage generator further comprises control means for varying the periodic bit-stream whereby the DC voltage level is controlled for temperature compensation. The control means may comprise means for varying a bit rate of the periodic bit-stream.

The DC voltage generator may further comprises asynchronous control means for independently controlling the DPM generator.

Preferably, the filter and DPM generator circuit are co-integrated on a chip.

In accordance with a further aspect of the invention, there is provided a method of generating a DC voltage. The method comprises the steps of generating a periodic bit-stream encoding a DC voltage level in an average value of the bit-stream; and averaging the periodic bit-stream to decode and produce the DC voltage. Preferably, the step of generating may comprise programming the periodic bit-stream in a memory and serially outputting the bit-stream. The memory may comprise a circular shift register or a linear feedback shift register. The periodic bit-stream is preferably a pulse density modulation bit-sequence. In an alternative embodiment, the step of generating comprises the steps of cyclically counting a counter value; comparing the counter value to a reference value; and outputting a bit-stream value in response to the comparison of the counter value and reference value.

In accordance with a preferred embodiment, the method further comprises the step of controlling the periodic bit-stream to control the DC voltage level for temperature compensation. The step of controlling may comprise varying a bit rate of the periodic bit-stream.

In accordance with an embodiment of the invention, the method may further comprise the step of asynchronously controlling the generation of the periodic bit-stream.

BRIEF DESCRIPTION OF THE DRAWINGS

Further features and advantages of the present invention will become apparent from the following detailed description taken in combination with the appended drawings, in which.

DETAILED DESCRIPTION OF THE INVENTION

The basic principles behind this invention are the use of digital pulse modulation to encode a DC level in the average value of a periodic bit-stream and the use of an averaging circuit (e.g. a passive low pass filter) to extract the DC level from the average.

In the present description of the invention binary voltage levels will be referred as ones and zeros, and analog DC voltages as values between zero and one. Hence all the voltage values are always normalized.

Figure 1:
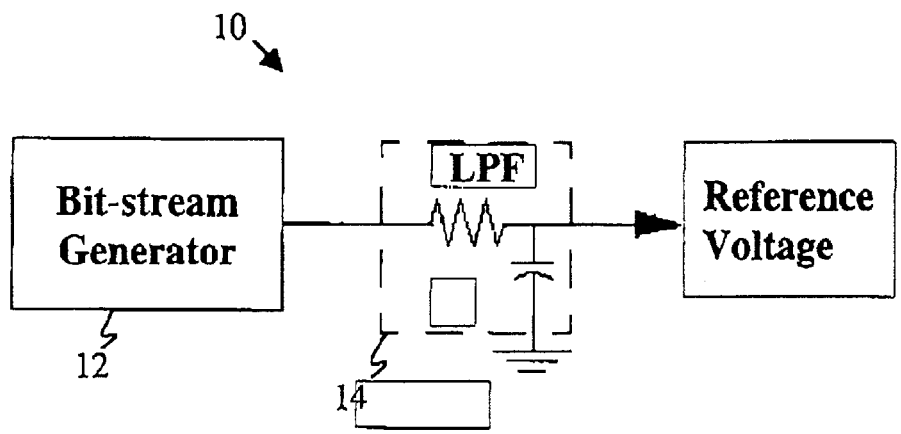
FIG. 1 is an schematic view of the DC voltage generator of the present invention.

In FIG. 1, there is shown the hardware components of the DC voltage generator 10 comprising a digital pulse modulation or bit-stream generator 12 and an averaging circuit 14. The averaging circuit 14 preferably comprises a passive filter such as a low pass RC filter. The RC filter implementing the averaging circuit 14 to extract the desired DC level may be appropriately configured by selecting resistance and capacitance values (R and C) described further below.

Figure 2:
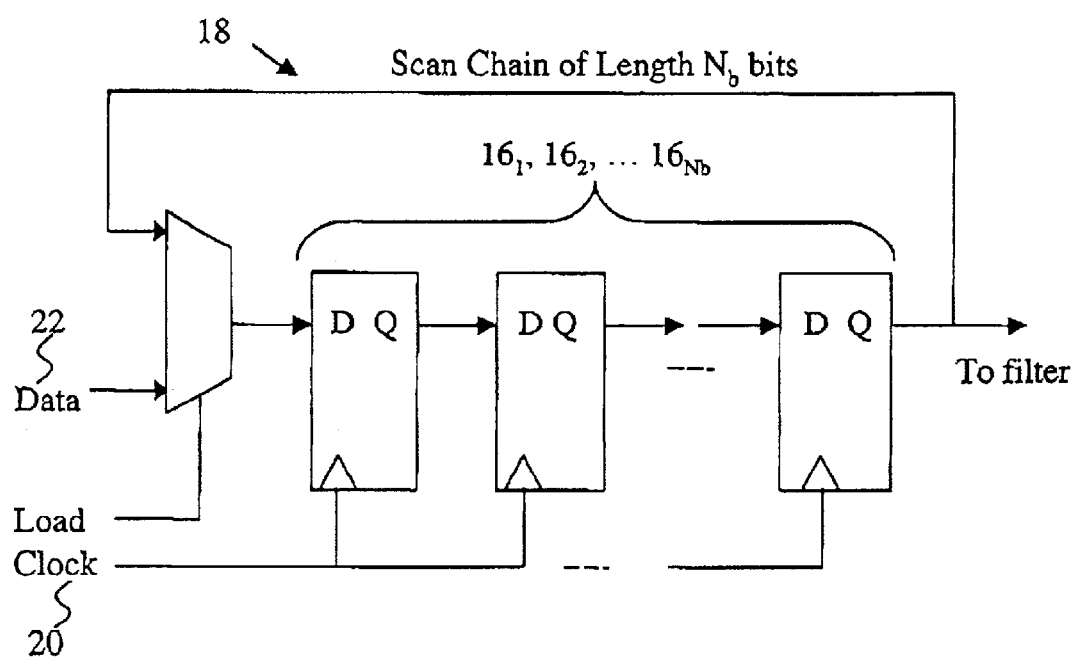
FIG. 2 is a detailed schematic view of a preferred embodiment of a bit-stream generator according to the invention of FIG. 1.

Bit-stream generator 12 is preferably memory based and is preferably implemented as illustrated in FIG. 2. by arranging a series of memory cells ($16_1$, $16_2$ $16_{Nb}$) for example D flip-flops, together in a circular shift register fashion to form a scan chain 18. The scan chain comprises means for receiving a series of bits encoding a DC level in a bit-stream; means for serially outputting the bits and means for circling the series of bits output to the means for receiving. Preferably, there is provided a programming means for selecting the series of bits encoding the DC level where the programming means provides the bit-stream to the means for receiving of the circular shift register. One output of a memory cell $16_{Nb}$ is used to provide the bit-stream. The two variables that one must choose are the clock rate of the clock source 20 and the length $N_b$ of the scan chain. The choice of $N_b$ will be explained shortly, and the clock rate, $F_s$, must be made as large as possible for reasons that will be apparent later.

Figure 3:
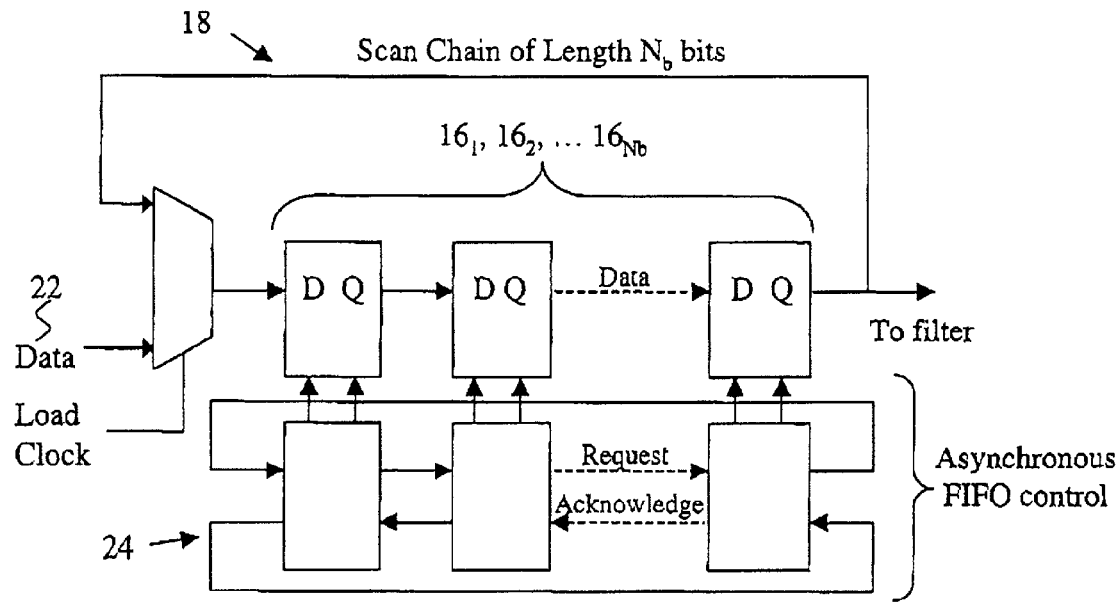
FIG. 3 shows an asynchronous implementation of the bit-stream generator of FIG. 1.

Bit-stream generator 12 in FIG. 1 can also be implemented by replacing the clock by an asynchronous control means such as asynchronous First In First Out (FIFO) controller 24 as illustrated in FIG. 3. The bit pattern may be shifted through scan chain 18 by making use of the self-timed nature of this circuit. The variable $N_b$, is set by the number of cells connected in the loop. The rate $F_s$ in this implementation is determined by the technology used to implement the FIFO controller 24 and the operating temperature of the circuit as is well known to those skilled in the art. This implementation has the added benefit of self-timed independence and may be implemented to operate at a very high speed.

Figure 4:
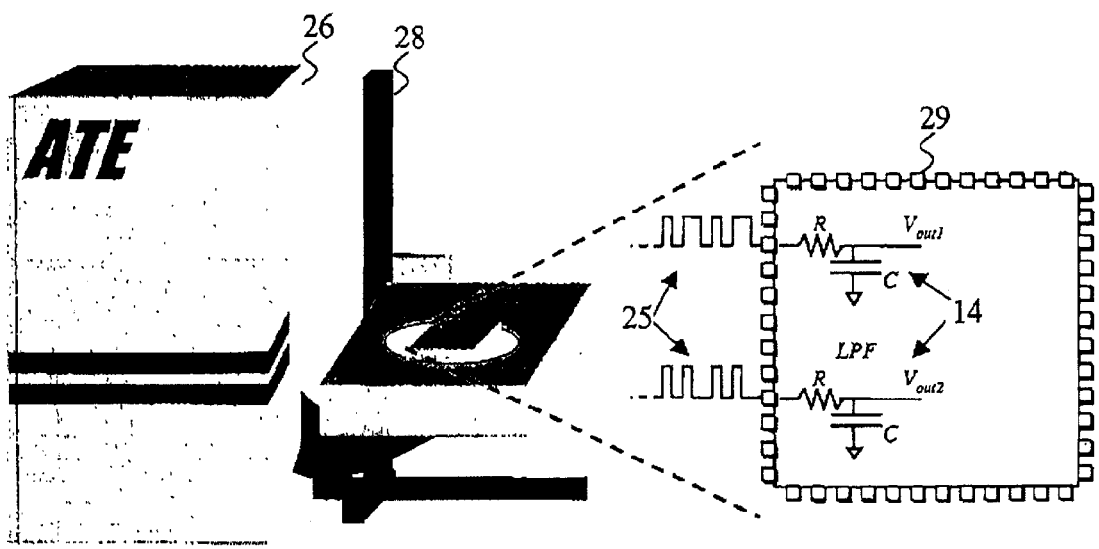
FIG. 4 shows how an Automated Test Equipment implementation as a bit-stream generator of FIG. 1.

A further alternative implementation for obtain bit-stream generator 12, albeit off-chip, is to make use of Automated Testing Equipment (ATE) 26 typically present at the testing and verification phase of integrated circuit production. FIG. 4 illustrates how an arbitrary bit-stream 25 generated by ATE 26 at a test bench 28 can be used with averaging circuit 14 on a chip 29 to generate an on-chip DC voltage reference. With this technique, the bit-stream length, $N_b$, and clock rate, $F_s$, are set by the ATE testing program. The later should be as large as possible for reasons that will be made apparent later.

Figure 14:
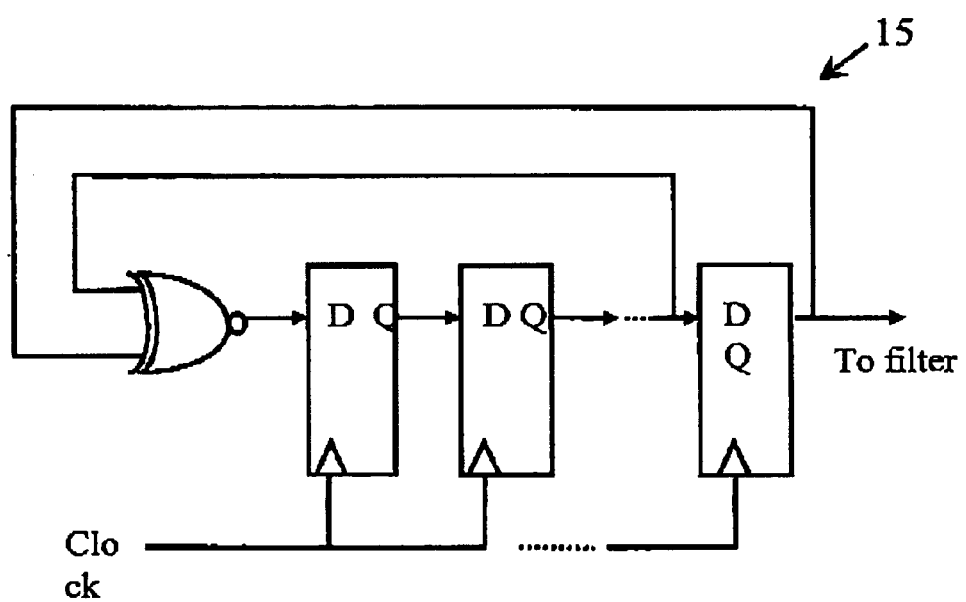
FIG. 14 illustrates a linear feedback shift register that way be used for the bit-stream generator of FIG. 1.

Many alternative digital pulse modulation generators 12 are envisioned within the present invention. For example, yet another memory based manner of generating a periodic bit-stream that is simple and compact to implement and an alternative to the D flip-flops of FIG. 1 is a linear feedback shift register (LFSR), such as LSFR 15 of FIG. 14. if only limited flexibility is required (in terms of the number of DC levels that need by encoded), an LSFR is a viable implementation for generating the periodic sequence fed to averaging circuit 14.

Figure 5:
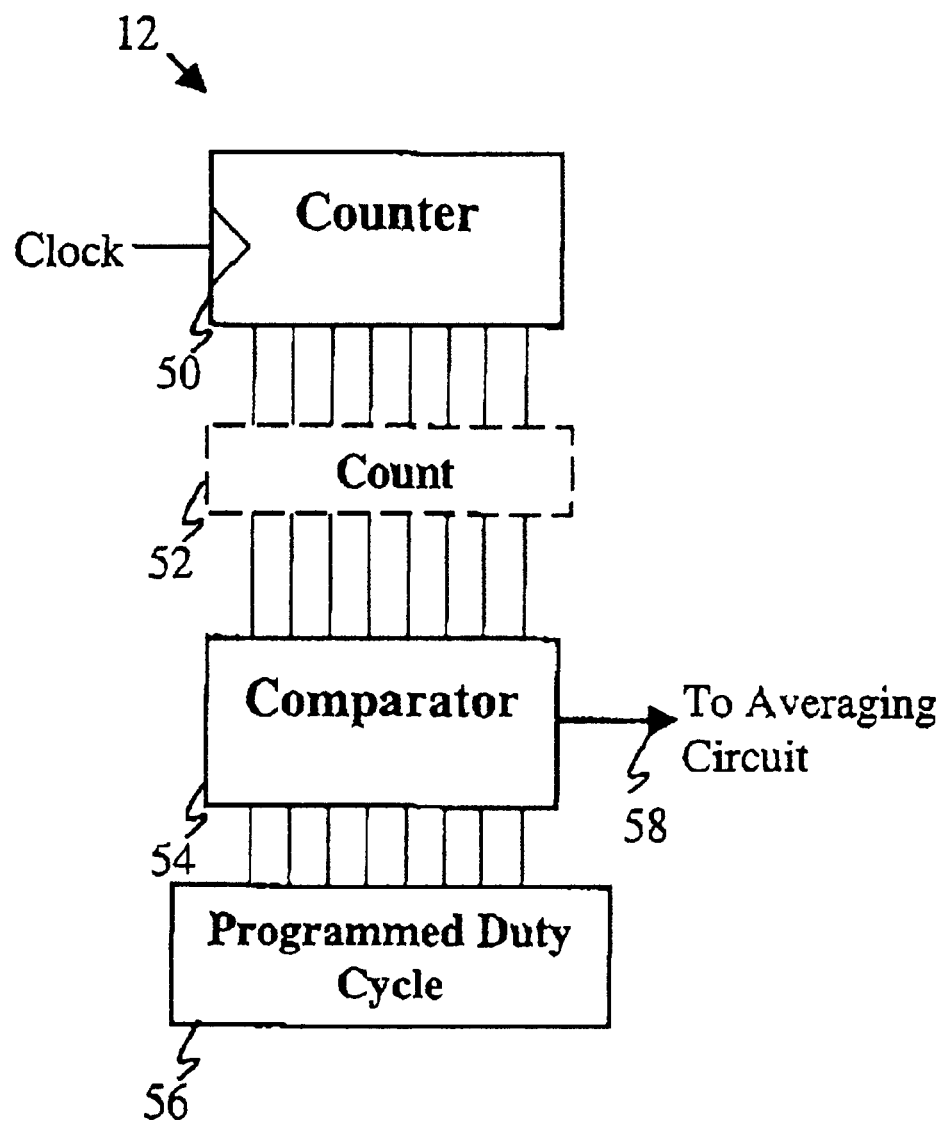
FIG. 5 shows a simple counter/comparator implementation as a bit-stream generator of FIG. 1.

FIG. 5 illustrates a further implementation for implementing a digital pulse modulation generator 12 for generating simple pulse-width modulated bit-streams. While a comparator 54 outputs an initial state, a cycling output count 52 of a clock counter 50 is compared via comparator 54 to an input word 56 describing the desired programmed duty cycle. Once the output count 52 matches the input word 56, the output 58 of comparator 54 is toggled for an appropriate duration (e.g. until counter count 52 reaches $N_b$), at which point comparator 54 toggles its output 58 to an initial state, output count is reset and the process is repeated.

Figure 6:
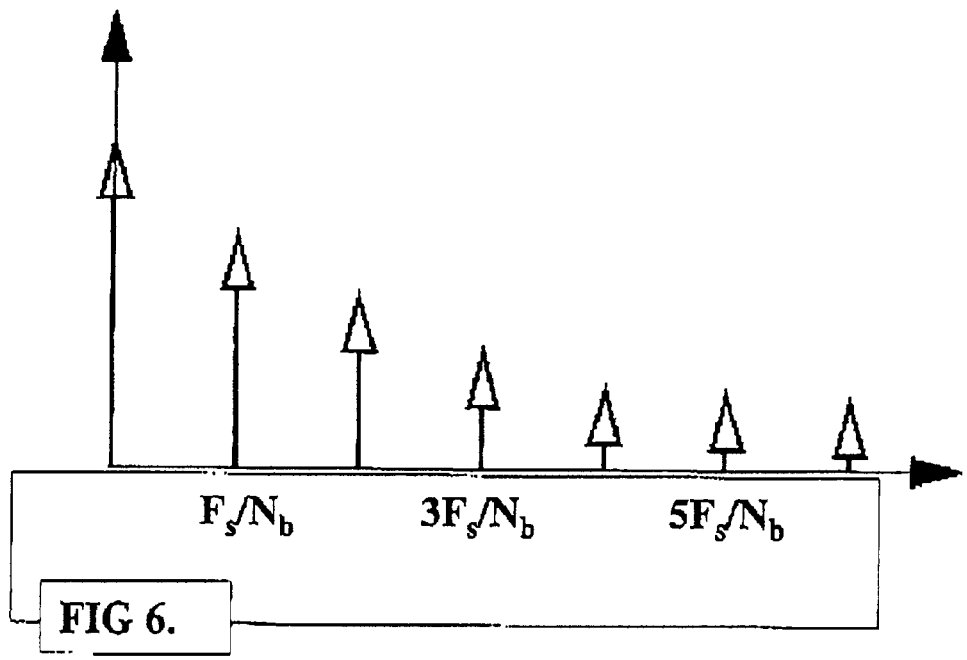
FIG. 6 is a typical frequency spectrum for a periodic bit-stream.

FIG. 6 shows the frequency spectrum of a typical periodic bit-stream. It consists of DC and AC components. The magnitude of the DC component is determined by the average value of the bit-stream, $N_1/N_b$, where $N_1$ is the number of ones in the bit-stream. The DC value will remain the same regardless of the ordering of the bits in the sequence. The AC components are harmonically related to the fundamental frequency $F_f$ of the bit-stream $F_s$, and the length $N_b$ of scan chain 18, according to the equation:

$$F_f = \frac{F_s}{N_b}$$

The magnitude of these harmonics will change depending on the order in which the bits are arranged in the periodic bit-stream.

The first design variable that must be chosen is the length $N_b$ of the scan chain 18. It can be shown that the normalized DC resolution $\Delta DC$ (ideal number of levels between zero and one) is given by the equation;

$$\Delta DC = \frac{1}{N_b}$$

For illustrative purposes, if 256 levels are desired between zero and one, then the scan chain length $N_b$ will have to be 256 bits long, The effects of the AC components on these DC levels must be considered. Clearly, it is these AC components that give rise to the fast transitions in the bit-stream. It is the objective of the low-pass RC filter to reduce these variations to insignificant levels. It is common practice to refer to the superposition of all AC components in the filtered signal as an AC ripple. Typically the maximum amplitude of the AC ripple is set to be less than ½ times the normalized DC resolution.

For the example when $N_b$ is 256, the maximum allowable AC ripple would be 1/512.

Figure 7:
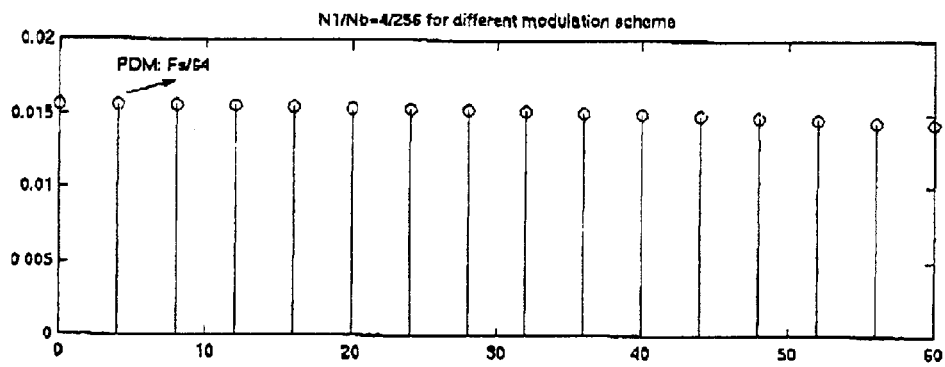
FIG. 7 illustrates PDM and PWM frequency spectrums for DC level 4/256.
Figure 7:
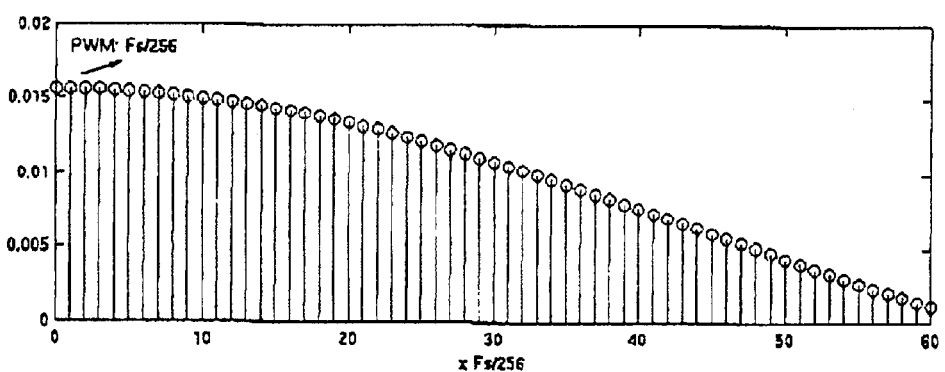

The next decision that must be made is the order in which the ones and zeros are arranged in the periodic bit-stream. As was stated earlier, the desired DC value will determine the number of ones ($N_1$) and zeros ($N_b$–$N_1$) in the bit-stream. The order in which they are arranged, determined by a digital pulse modulation scheme, will affect the distribution of power in the AC components, The optimal manner in which to select the bit pattern is to distribute the ones in such a way that it creates the maximum number of repetitions in the bit stream. In other words, minimize the period of the fundamental. By doing so, the frequency of the fundamental tone will be placed higher in frequency, as well as its harmonics. This in turn reduces the value of the RC filters time constant for the same AC ripple value. For example, if four ones are spread evenly throughout the 256 bit scan-chain, the fundamental period of the bit-stream will be 256/4, or 64, thus the harmonics frequency will appear at multiples of $F_s/64$. If they are placed in sequence, four ones in a row followed by 254 zeros, then the fundamental period is 256, thus the harmonic frequencies are placed at multiples of $F_s/256$, The latter case would be considered the worst-case whereas the first case is the best case as the frequency of the fundamental is placed at the highest possible frequency. FIG. 7 illustrates these two cases.

The latter case is effectively the digital pulse modulation scheme known as pulse width modulation, where the DC value is encoded in the width of the pulse which is set by $N_1$ consecutive ones. The process of distributing the ones evenly throughout the period $N_b$ is known as pulse density modulation, where a DC value is encoded in the density of the ones and zeros. A PDM digital pulse modulation bit-stream is simple to obtain when the number of ones divide evenly into the scan chain length $N_b$ as in the previous example, but becomes more difficult to obtain when it does not.

Figure 8:
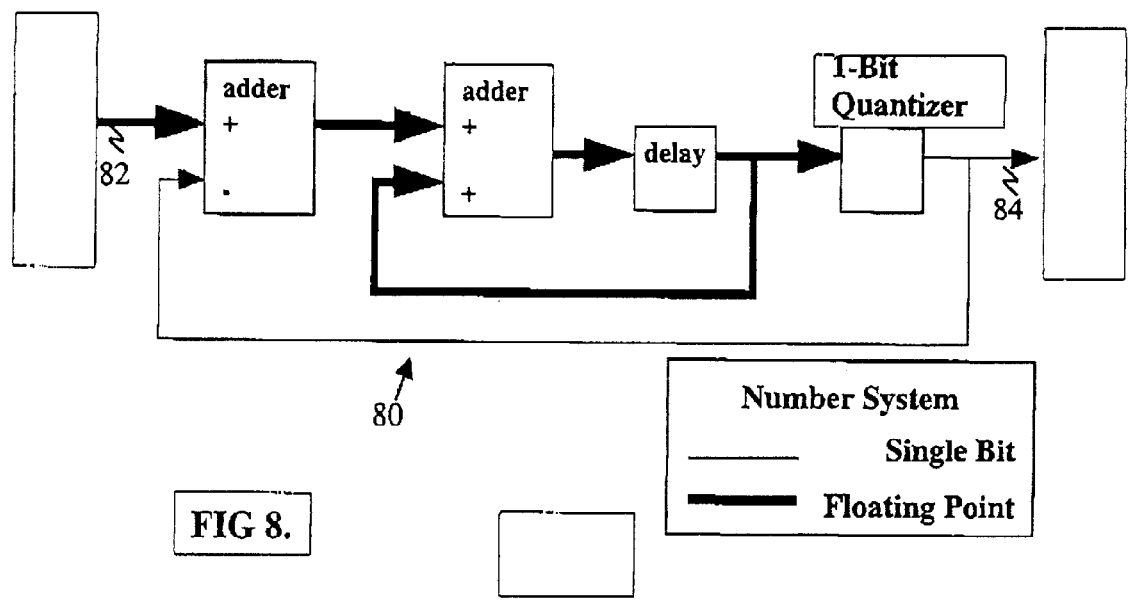
FIG. 8 is a functional representation of a first order sigma-delta. (ΣΔ) modulator.

For the purpose of this invention, this encoding process is simplified if the bit-streams are obtained from a sigma delta modulator implemented in software. FIG. 8 shows the functional blocks required to implement a $1^{st}$ order sigma delta modulator 80. This modulator effectively encodes the desired DC level into a pulse density modulated bit-stream in a manner that minimizes the period of the fundamental. By applying a DC signal of value $N_1/N_b$ at the input 82 of modulator 80, where $N_1$ and $N_b$ are relatively prime (no common factors), one can show that the period of the fundamental will be $N_b/N_1$. The output bit sequence 84 can then be loaded in scan-chain 18 via data input 22 (FIG. 2).

Once a bit-stream is obtained that contains the desired DC level, an averaging circuit 14 must be designed in order to sufficiently attenuate the AC components so that the desired amplitude resolution may be achieved. The attenuation created by a first-order low pass RC filter averaging circuit 14 is described by the following equation:

$$|H(f)| = \frac{1}{\sqrt{1 + (2\pi \cdot f \cdot RC)^2}}$$

The choice of the RC time constant will affect two parameters in the design: the AC ripple and the settling time. The larger the RC time constant, the greater the attenuation provided by filter 14 and, hence, reduced AC ripple. However, a longer settling time is required to reach the desired DC level due to the charging process associated with the capacitor. For a step input of 1 V, the output voltage of RC filter 14 as a function of time is clearly dependent on the value of RC given by;

$$V(t) = 1 - e^{-t/RC}$$

Figure 9:
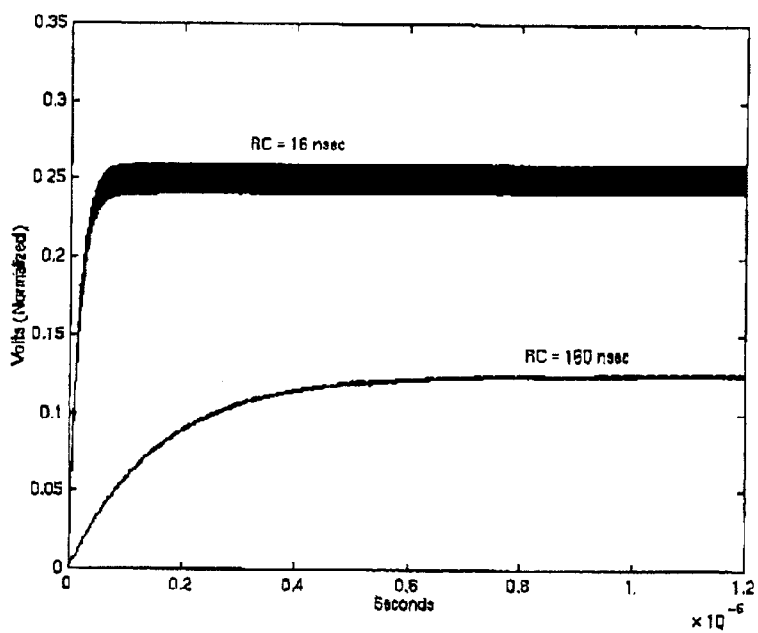
FIG. 9 shows ripple amplitude and convergence time for different time constants.

The larger the RC time constant, the longer it takes filter 14 to reach a particular output level. This is illustrated in FIG. 9 for two different RC time constants. The sizes of the input step were intentionally made different so that the settling behavior is made clearly visible. By pushing the fundamental frequency of the AC components in the bit-stream to the highest possible frequency, an RC filter can be designed with the smallest possible time constant. For the example stated earlier, the RC time constant for the PDM case can be made 64 times smaller than that called for in the PWM case for the same amount of AC ripple. So a PDM bit-stream will have a faster settling time than a PWM bit-stream.

Figure 10:
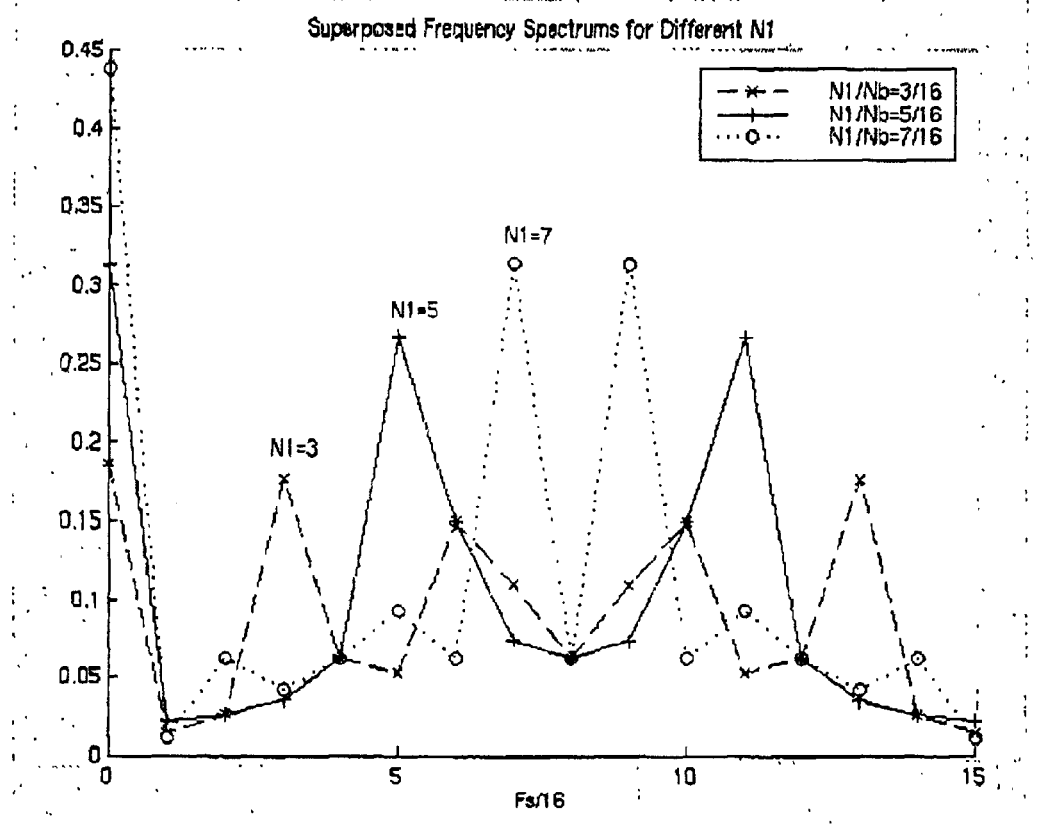
FIG. 10 shows three superposed frequency spectrums for different DC levels where $N_1$ does not divide evenly into $N_b$=16.

In order to quantify the value of R and C, the DC and AC components of the PDM periodic bit-stream must be characterized. There are two cases to consider: (a) the total number of bits in the bit-stream is an integer multiple of the number of ones in the bit-stream (i.e., $N_b = \alpha N_1$ where $\alpha$ is an integer less than $N_b$,) and (b) the total number of bits in the bit-stream is a non-integer multiple of the number of ones in the bit-stream, i.e., $N_b$ and $N_1$ are relatively-prime. In case (a), the AC components will be located at frequencies that are multiplies of $F_s * N_1/N_b$ or $F_s/\alpha$ with a maximum magnitude of $N_1/N_b = 1/\alpha$. In case (b), most of the AC power will concentrate at frequencies that are multiplies of $F_s * N_1/N_b$. As was previously the case, however, some power will also appear at other frequencies. Because of this, the magnitude of the harmonics at the multiples of $F_s * N_1/N_b$ decreases with increasing frequency, and some smaller non-zero magnitude harmonics appear between them. FIG. 10 illustrates the frequency spectrum of three bit-streams corresponding to $N_1/N_b$ ratios of 3/16, 5/16 and 7/16. It is observed that the fundamental frequency of $F_s * N_1/N_b$ is always largest in magnitude. If the largest harmonic of each bit-stream is plotted on the same frequency scale, it can be observed that there magnitude increase at a rate of 20 dB/decade, This would be observable from FIG. 10 if the frequency axis was plotted on a log scale.

Figure 11:
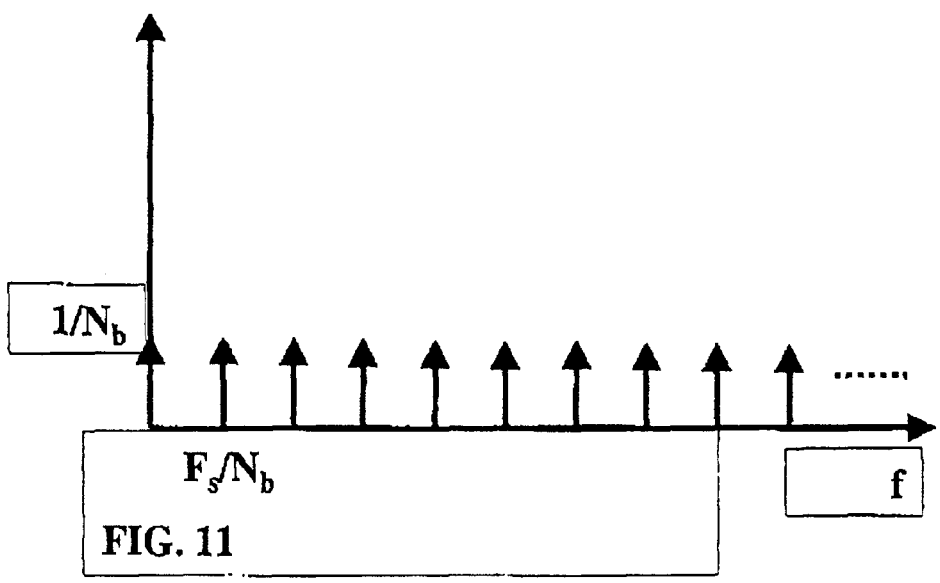
FIG. 11 illustrates a frequency spectrum for $1/N_b$ DC value.

This observation suggests that it is sufficient to design first-order RC filter 14 for the simplest bit-stream case consisting of a single one ($N_1 = 1$) and $N_b - 1$ zeros. Whatever is claimed for this case will apply to all other bit-stream patterns consisting of the same number of bits. This is because the first-order filter's attenuation increases at the same rate of 20 dB/decade as the magnitude of the fundamental component of the bit-stream and therefore offsets the increase in magnitude of the fundamental component. The problem then becomes clearer as it is known that for this simple bit-stream arrangement, the harmonics are of smaller magnitude than the DC tone which has a magnitude of $1/N_b$. Further, it consists of frequencies that are multiples of $F_s/N_b$ as is depicted in FIG. 11. In order to simplify the problem the following steps will assume that all the harmonics have the same magnitude, $1/N_b$. This will effectively over design the filter. After passing the bit-stream through RC filter 14, the RMS magnitude of the $k^{th}$ harmonic can be described as follows:

$$|H(k)| = \frac{1}{\sqrt{2}} \times \frac{1}{N_b} \frac{1}{\sqrt{1 + \left(2\pi \cdot RC \cdot k \frac{F_s}{N_b}\right)^2}}$$

Finally, to satisfy the AC ripple requirements, the sum of the power in all the AC components must be made less than the RMS value of the AC ripple requirement, i.e., $$\sum_{k=1}^{\infty} H_k^2 \leq \left(\frac{1}{\sqrt{2}} \times \frac{1}{2} \times \frac{1}{N_b}\right)^2$$

Consequently, substituting the appropriate expression for the harmonics leads to an equation involving RC:

$$\sum_{k=1}^{\infty} \frac{1}{1 + \left(2\pi \cdot RC \cdot k \cdot \frac{F_s}{N_b}\right)^2} \leq \frac{1}{4}$$

Limiting the summation to approximately 100 terms (as the higher order terms add little to the summation) enables the user to numerically search for the value of RC that best satisfies the ripple requirement. We see from the above expression that the value of the time constant can be minimized by selecting the clock rate $F_s$ of the scan chain 18 as large as possible. This will help to minimize the total silicon area required by the DC generator.

As an example, a bit-stream operating at 1 GHz is to produce a DC signal with a normalized DC resolution of 1/256. This suggests that the number of bits in the bit-stream should be at least 256. To simplify the amount of digital hardware, we shall select $N_b = 256$. Next, the RC time constant of the first-order filter 14 may be determined from the following expression using an iterative numerical procedure:

$$\sum_{k=1}^{100} \frac{1}{1 + \left(2\pi \cdot RC \cdot k \cdot \frac{10^9}{256}\right)^2} \leq \frac{1}{4}$$

The result is RC=99.1 ns for an RMS AC ripple of 0.14 mV or a 0.198 mV amplitude AC ripple. To choose for R and C one must look at the thermal noise generated by the resistor, i.e.

$$V^2(f) = 4kTR$$

Where $V^2(f)$ is the spectral density function for the noise voltage, T is the temperature in Kelvin, and k is the Boltzmann's constant ($1.38 \times 10^{-23}$ JK$^{-1}$). Note that the noise spectrum is flat. The effective RMS noise through the RC filter is $$V_{RMS} = \sqrt{\frac{kT}{C}}$$

Thus, it is independent of R. The latter equation essentially sets a lower bound on the capacitor value that may be used for the RC. So for the previous example, the RMS noise should be less than the RMS AC ripple, $$\frac{1}{\sqrt{2}} \times \frac{1}{512}$$

Setting this value equal to $V_{RMS}$, the smallest C can be made is 2.17 fF. The motivation then is to make the area of the capacitor and resistor about the same as long as C is more than 2.17 fF. In the 0.35 um CMOS process this would yield an R=330 KΩ and a C=305 fF. In general, the capacitor size will be a lot bigger than its lower bound value.

Figure 12:
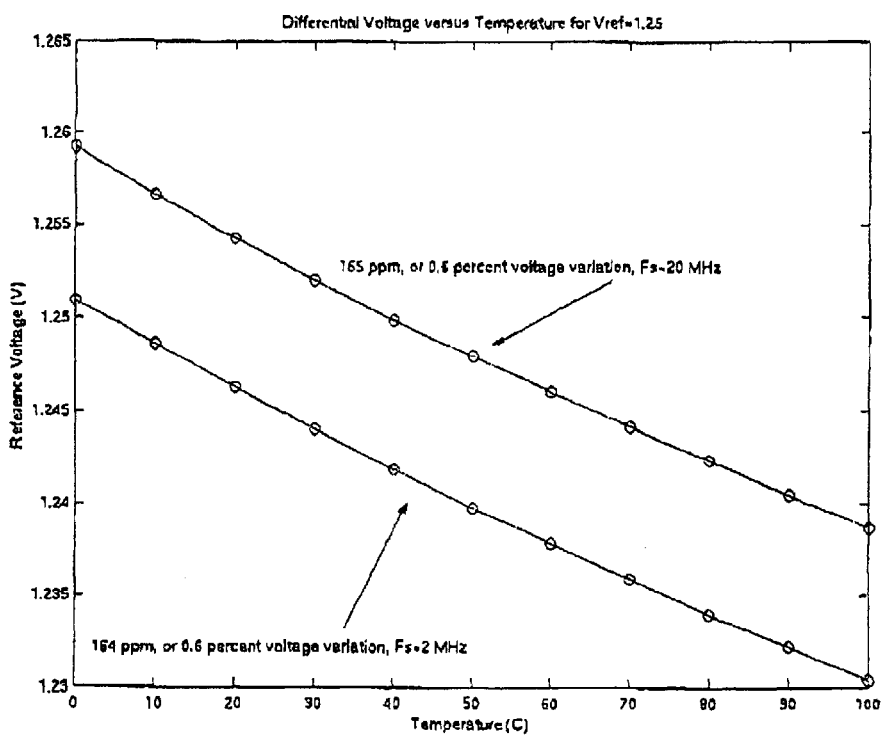
FIG. 12 illustrates the temperature dependence of the DC voltage generator for different sampling frequencies.
Figure 13:
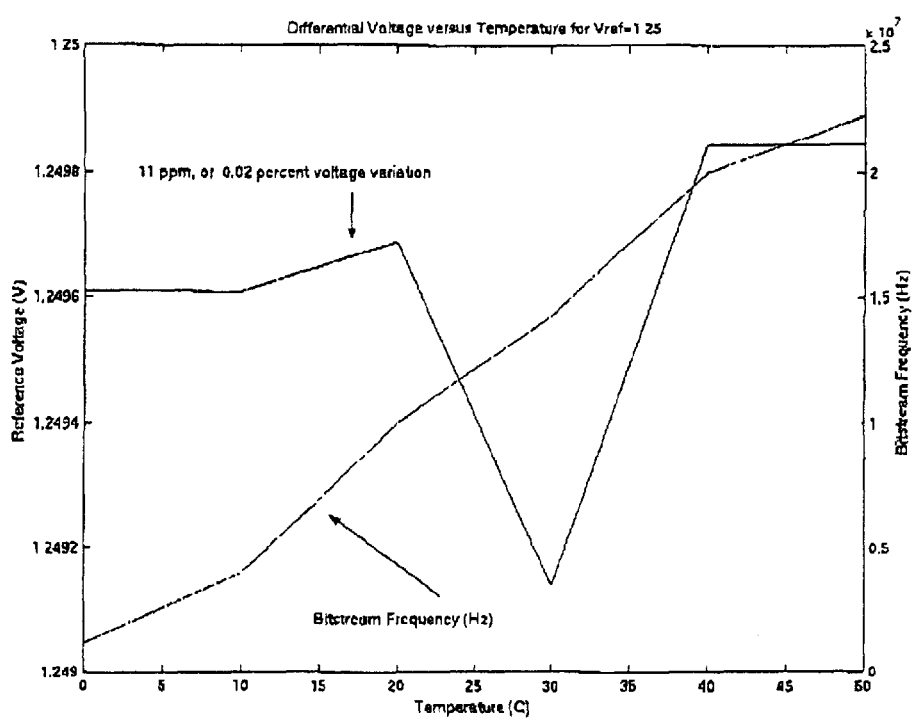
FIG. 13 illustrates the use of frequency compensation to make the DC voltage generator insensitive to temperature variation.

One of the most important and desirable properties of this invention is that it exhibits low dependence to temperature. That is, increases in temperature have only a mild effect on the value of the DC reference voltage level. FIG. 12 shows a plot of voltage versus temperature for two different bit-stream clock rates ($F_s$=2 MHz or 20 MHz). Advantageously, the reference voltage of the proposed invention also exhibits a dependence on the clock rate of the bit-stream. Making use of this fact provides a means of compensating the voltage reference so it is essentially temperature insensitive as illustrated in FIG. 13. Thus, the DC voltage reference may be controlled for temperature compensation by either amending the bit-stream transmitted (depending on the precision of the chosen bit-stream length $N_b$) or by varying the bit transmission rate. It will be apparent to those skilled in the art that subtle varying of the clock speed of the various appropriate bit stream generators disclosed herein will vary the transmission rate.

The proposed invention is an area efficient and robust programmable reference voltage generator that benefits from the scaling properties of digital integrated circuit technology. Specifically, it does not suffer from power supply scaling, and since it uses an almost all-digital implementation, its speed and area are expected to benefit greatly from scaling.

Voltage reference generators find use in a wide variety of applications. In particular, the invention can be used as a DC bias source, which is needed in virtually all analog circuits (e.g. operational amplifiers, charge pumps, and delay elements). Also, voltage references find common use in switched-capacitor circuits, and in A/D converters. This widespread applicability of the invention, coupled with its simplicity and stability, means that it can be easily adopted in various commercial applications.

Another application for the invention is in the area of built-in self-test (BIST) of analog circuits. In general, BIST circuits need to be robust to process variation, reliable, area efficient, temperature insensitive, and fast. The present invention possesses all of these properties.

The embodiment(s) of the invention described above is (are) intended to be exemplary only. Modifications will be apparent to those skilled in the art. The scope of the invention is therefore intended to be limited solely by the scope of the appended claims.

We claim:

1. A DC voltage generator comprising:
   a digital pulse modulation (DPM) generator generating a periodic bit-stream preconfigured to encode a desired DC voltage level in the average value of the bit-stream; and
   an analog averaging circuit receiving and decoding the periodic bit-stream so as to generate an average DC voltage corresponding to the desired DC voltage level.

2. The DC voltage generator of claim 1 wherein the DPM generator is memory based and comprises:
   a circular shift register having means for receiving a series of bits encoding the desired DC voltage level in a bit-stream; means for serially outputting the bits and means for circling the series of bits output to the means for receiving.

3. The DC voltage generator of claim 2 wherein the DPM generator further comprises a programming means for selecting the series of bits encoding the desired DC voltage level, said programming means providing the bit-stream to the means for receiving of the circular shift register.

4. The DC voltage generator of claim 3, wherein the programming means comprises a software based $\Sigma\Delta$ modulator.

5. The DC voltage generator of claim 2 wherein the bit-stream is a pulse density modulation bit-stream.

6. The DC voltage generator of claim 2 wherein the bit-stream is a pulse width modulation bit-stream.

7. The DC voltage generator of claim 1 wherein the DPM generator comprises a memory based periodic bit-stream generator circuit.

8. The DC voltage generator of claim 7 wherein the DPM generator comprises a programming means for selecting the bit-stream encoding the desired DC voltage level.

9. The DC voltage generator of claim 7 wherein the memory based period bit stream generator circuit includes a memory, operatively configured to contain a series of bits, and a cycling circuit operatively configured to cycle the series of bits so as to generate the periodic bit-stream.

10. The DC voltage generator of claim 1 wherein the DPM generator comprises a pulse density modulation (PDM) generator circuit for encoding the desired DC voltage level in a PDM periodic bit-stream.

11. The DC voltage generator of claim 10 wherein the PWM generator is memory based and comprises:
   a counter for outputting a count; and
   a comparator for receiving the count, comparing the count to a reference value, and outputting the PWM periodic bit-stream in response to the comparison of the count and reference value.

12. The DC voltage generator of claim 1 further comprising control means for varying the periodic bit-stream whereby the desired DC voltage level is controlled for temperature compensation.

13. The DC voltage generator of claim 12, wherein the control means comprises means for varying a bit rate of the periodic bit-stream.

14. The DC voltage generator of claim 1 wherein the DPM generator comprises a pulse width modulation (PWM) generator circuit for encoding the desired DC voltage level in a PWM periodic bit-stream.

15. The DC voltage generator of claim 1 wherein the DPM generator is memory based and comprises a linear feedback shift register.

16. The DC voltage generator of claim 1 wherein the DPM generator is an automated test equipment.

17. The DC voltage generator of claim 1 wherein the analog averaging circuit comprises a capacitor and resistor for generating the average DC voltage.

18. The DC voltage generator of claim 1 further comprising asynchronous control means for asynchronously controlling the DPM generator.

19. The DC voltage generator of claim 1 wherein the DPM generator and analog averaging circuit are co-integrated on a chip.

20. A method of generating a desired DC voltage comprising the steps of:
  selecting a desired DC voltage level;
  generating a periodic bit-stream encoding the desired DC voltage level in an average value of the periodic bit-stream; and
  averaging the periodic bit-stream to decode and produce a DC voltage corresponding to the desired DC voltage level.

21. The method of claim 20 wherein the step of generating comprises programming the periodic bit-stream in a memory and serially outputting the bit-stream.

22. The method of claim 21 further comprising the step of encoding the desired DC voltage level in a series of bits and the step of generating includes periodically cycling through the series of bits so as to generate the periodic bit-stream.

23. The method of claim 21 wherein the memory comprise a linear feedback shift register.

24. The method of claim 21 wherein the memory is provided by automated test equipment.

25. The method of claim 21 further comprising the step of encoding the desired voltage level in a pulse width modulation or a pulse density modulation bit stream.

26. The method of claim 20 further comprising the step of controlling the periodic bit-stream to control the DC voltage for temperature compensation.

27. The method of claim 26 wherein the step of controlling comprises varying a bit rate of the periodic bit stream.

28. The method of claim 20 wherein the step of generating comprises the steps of:
  cyclically counting a counter value;
  comparing the counter value to a reference value; and
  outputting a bit-stream value in response to the comparison of the counter value and reference value.

29. The method of claim 20 wherein the step of averaging comprises filtering the periodic bit-stream.

30. The method of claim 20 further comprising the step of asynchronously controlling the generation of the periodic bit stream.

31. A DC voltage generator comprising:
  a digital pulse modulation generator that includes:
    a memory operatively configured to store a series of bits that encodes a desired DC voltage level as the average value of the series of bits; and
    cycling circuitry operatively configured to cycle the series of bits so as to generate a periodic bit-stream; and
  an analog averaging circuit for receiving and decoding the period bit-stream so as to generate an average DC voltage corresponding to the desired DC voltage level.

* * * * *